United States Patent
Zhu et al.

(10) Patent No.: US 8,756,590 B2
(45) Date of Patent: Jun. 17, 2014

(54) BINDING DATA PARALLEL DEVICE SOURCE CODE

(75) Inventors: Weirong Zhu, Kirkland, WA (US); Lingli Zhang, Sammamish, WA (US); Sukhdeep S. Sodhi, San Jose, CA (US); Yosseff Levanoni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 12/820,240

(22) Filed: Jun. 22, 2010

(65) Prior Publication Data

US 2011/0314458 A1    Dec. 22, 2011

(51) Int. Cl.
 *G06F 9/45* (2006.01)
(52) U.S. Cl.
 USPC .............................. 717/149; 717/140; 717/146
(58) Field of Classification Search
 None
 See application file for complete search history.

(56) References Cited

U.S. PATENT DOCUMENTS

| | | | | |
|---|---|---|---|---|
| 5,261,095 A * | 11/1993 | Crawford et al. | ............. | 717/149 |
| 7,487,496 B2 * | 2/2009 | O'Brien et al. | ............... | 717/149 |
| 8,136,102 B2 * | 3/2012 | Papakipos et al. | ............ | 717/149 |
| 8,161,464 B2 * | 4/2012 | Archambault et al. | ........ | 717/140 |
| 8,209,664 B2 * | 6/2012 | Yu et al. | ......................... | 717/119 |
| 8,250,549 B2 * | 8/2012 | Reid et al. | ...................... | 717/149 |
| 8,296,743 B2 * | 10/2012 | Linderman et al. | ............ | 717/140 |
| 8,375,374 B2 * | 2/2013 | O'Brien et al. | ................ | 717/149 |
| 8,397,241 B2 * | 3/2013 | Xiaocheng et al. | ............ | 719/312 |
| 8,443,348 B2 * | 5/2013 | McGuire et al. | ............... | 717/146 |
| 8,443,349 B2 * | 5/2013 | Papakipos et al. | ............ | 717/146 |
| 8,584,106 B2 * | 11/2013 | Papakipos et al. | ............ | 717/140 |
| 8,589,867 B2 * | 11/2013 | Zhang et al. | .................... | 717/106 |
| 2004/0003370 A1 | 1/2004 | Schenk et al. | | |
| 2006/0098018 A1 * | 5/2006 | Tarditi et al. | ................... | 345/505 |
| 2006/0195828 A1 * | 8/2006 | Nishi et al. | ...................... | 717/140 |
| 2008/0001952 A1 | 1/2008 | Srinivasan et al. | | |
| 2008/0018652 A1 | 1/2008 | Toelle et al. | | |
| 2008/0109795 A1 * | 5/2008 | Buck et al. | ...................... | 717/137 |
| 2008/0244599 A1 * | 10/2008 | Hodson et al. | ................ | 718/104 |
| 2009/0007085 A1 * | 1/2009 | Owen et al. | .................... | 717/146 |
| 2009/0259828 A1 * | 10/2009 | Grover et al. | .................. | 717/140 |
| 2009/0322751 A1 | 12/2009 | Oneppo et al. | | |
| 2010/0192130 A1 * | 7/2010 | Hawblitzel et al. | ........... | 717/140 |
| 2010/0205580 A1 * | 8/2010 | McAllister et al. | ............ | 717/106 |
| 2011/0035736 A1 * | 2/2011 | Stefansson et al. | ........... | 717/149 |

(Continued)

OTHER PUBLICATIONS

Aho, Alfred V.; Sethi, Ravi; and Ullman, Jeffery D., Compilers: Principles, Techniques, and Tools c.1986 Reprinted Mar. 1988 Addison-Wesley pp. 11-12.*

(Continued)

*Primary Examiner* — Thuy Dao
*Assistant Examiner* — Ravi K Sinha
(74) *Attorney, Agent, or Firm* — Kevin Sullivan; Kate Drakos; Micky Minhas

(57) ABSTRACT

A compile environment is provided in a computer system that allows programmers to program both CPUs and data parallel devices (e.g., GPUs) using a high level general purpose programming language that has data parallel (DP) extensions. A compilation process translates modular DP code written in the general purpose language into DP device source code in a high level DP device programming language using a set of binding descriptors for the DP device source code. A binder generates a single, self-contained DP device source code unit from the set of binding descriptors. A DP device compiler generates a DP device executable for execution on one or more data parallel devices from the DP device source code unit.

16 Claims, 6 Drawing Sheets

(56) References Cited

U.S. PATENT DOCUMENTS

2011/0314256 A1* 12/2011 Callahan et al. ............... 712/17
2011/0314444 A1* 12/2011 Zhang et al. ................. 717/106
2012/0005662 A1* 1/2012 Ringseth et al. ............. 717/149

OTHER PUBLICATIONS

Aho, Alfred V.; Sethi, Ravi; and Ullman, Jeffery D., Compilers: Principles, Techniques, and Tools c.1986 Reprinted Mar. 1988 Addison-Wesley pp. 11-12, 284-393, 424, 463, and 546-547.*

Overland, Brian; C++ Without Fear: A Beginners Guide That Makes You Feel Smart. c2005, 7th printing Dec. 2007. Prentice Hall Proffesional Technical Reference. pp. 231-234.*

Ueng, Sain-Zee, et al., CUDA-lite: Reducing GPU programming complexity, [Online] 2008, Languages and Compilers for Parallel Computing. Springer Berlin Heidelberg, 2008, [Retrieved from the Internet] <http://download.springer.com/static/pdf/810/bok%253A978-3-540-89740-8.pdf?auth66=1390765121_6203534a83d560db0310ac2893fda019&ext=.pdf> pp. 1-15.*

Klöckner et al., PyCUDA: GPU run-time code generation for high-performance computing, [Online] 2009, [Retrieved from the Internet] <http://www.cs.berkeley.edu/~yunsup/papers/PyCUDA-2009.pdf> 19 Pages.*

Seyong Lee, Seung-Jai Min, and Rudolf Eigenmann, OpenMP to GPGPU: a compiler framework for automatic translation and optimization, [Online] 2009, SIGPLAN Not.44, 4 (Feb. 2009), [Retrieved from the Internet] <http://doi.acm.org/10.1145/1594835.1504194> pp. 101-110.*

Seyong Lee and Rudolf Eigenmann, OpenMPC: Extended OpenMP Programming and Tuning for GPUs, [Online] 2010 in Proceedings of the 2010 ACM/IEEE International Conference for High Performance Computing, Networking, Storage and Analysis (SC '10), [Retrieved from the Internet] <http://dx.doi.org/10.1109/SC.2010.36> pp. 1-11.*

Sukhwani, et al., "Fast Binding Site Mapping using GPUs and CUDA", Retrieved at << http://www.bu.edu/caadlab/GPU_FTMap_TR2010_1.pdf>>, IEEE International Symposium on Parallel & Distributed Processing, Workshops and Phd Forum (IPDPSW), Apr. 19-23, 2010, pp. 13.

Lee, et al., "GPU Kernels as Data-Parallel Array Computations in Haskell", Retrieved at << http://www.cse.unsw.edu.au/~chak/papers/gpugen.pdf >>, Feb. 12, 2009, pp. 7.

Folkegård, et al., "Dynamic Code Generation for Realtime Shaders", Retrieved at << http://www.ep.liu.se/ecp/013/ecp04013.pdf >>, The Annual SIGRAD Conference, Special Theme—Environmental Visualization, SIGRAD, Nov. 24-25, 2004, pp. 69.

Buck, et al., "Brook for GPUs: Stream Computing on Graphics Hardware", Retrieved at << http://graphics.stanford.edu/papers/brookgpu/brookgpu_0285_submitted.pdf >>, ACM Transactions on Graphics (TOG), Proceedings of ACM SIGGRAPH, vol. 23, No. 3, Aug. 2004, pp. 10.

* cited by examiner

BINDING DATA PARALLEL DEVICE SOURCE CODE

BACKGROUND

Computer systems often include one or more central processing units (CPUs) and one or more data parallel devices (e.g., graphics processing units (GPUs)). CPUs and data parallel devices typically operate using different instruction sets defined by their respective architectures such that CPU instructions may not be executable on data parallel devices and vice versa. CPUs generally perform all general purpose processing on computer systems, and data parallel devices generally perform data parallel processing (e.g., graphics processing) on computer systems.

Because of their different instructions sets and functions, CPUs and data parallel devices are often programmed using different high-level programming languages. For example, a CPU may be programmed using general purpose programming languages such as C or C++, and a data parallel device, such as a graphics processing unit (GPU), may be programmed using data parallel device programming languages, such as HLSL, GLSL, or Cg. Data parallel device programming languages, however, often have limitations that are not found in CPU programming languages. These limitations stem from the supporting role that data parallel devices have played to CPUs in executing programs on computer systems. As the role of data parallel devices increases due to enhancements in data parallel device processing capabilities, it would be desirable to enhance the ability of programmers to program data parallel devices.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A compile environment is provided in a computer system that allows programmers to program both CPUs and data parallel devices (e.g., GPUs) using a high level general purpose programming language that has data parallel (DP) extensions. A compilation process translates modular DP code written in the general purpose language into DP device source code in a high level DP device programming language using a set of binding descriptors. A binder generates a single, self-contained DP device source code unit from the set of binding descriptors. A DP device compiler generates a DP device executable for execution on one or more data parallel devices from the DP device source code unit.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
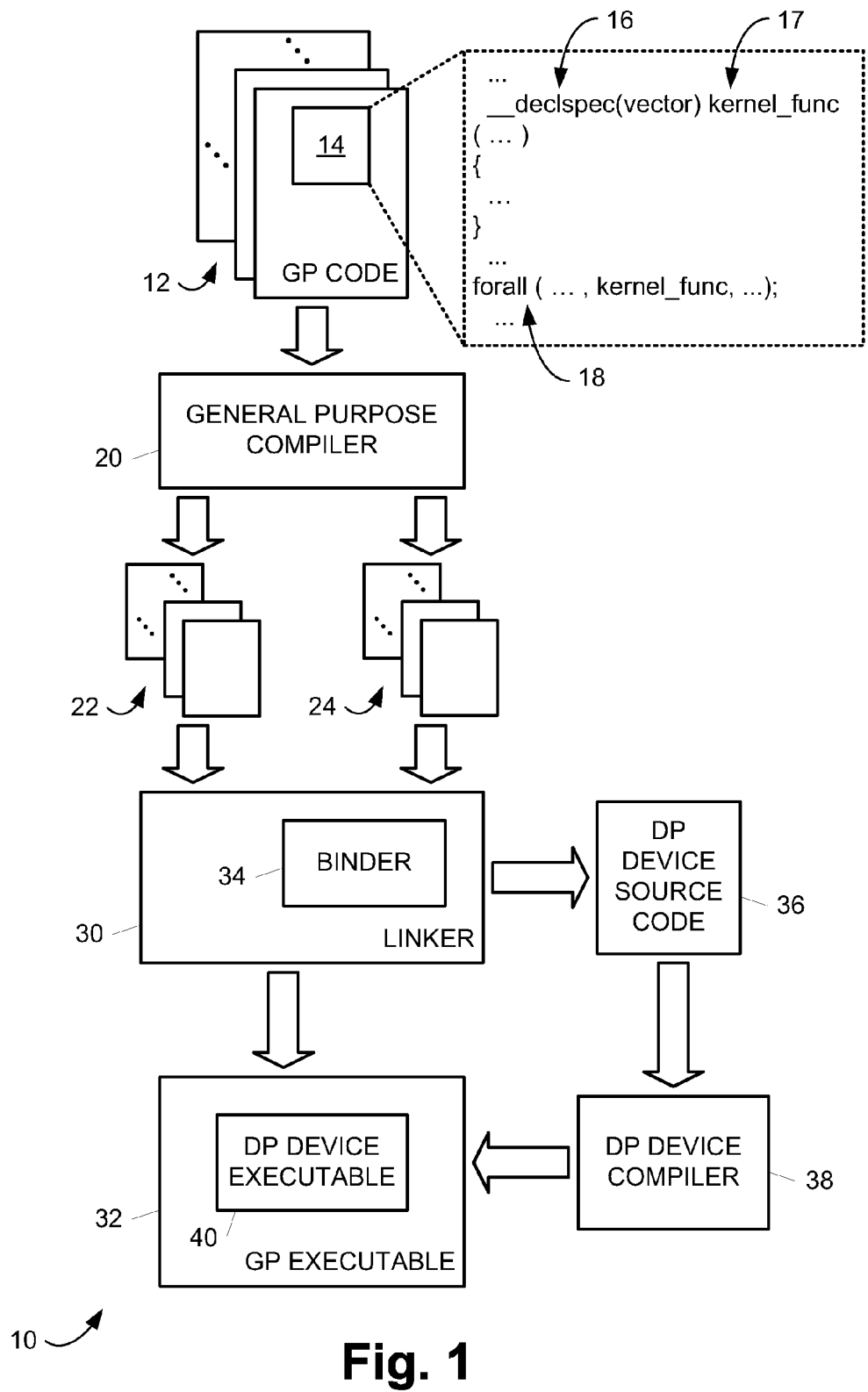
FIG. 1 is a block diagram illustrating an embodiment of a compile environment in a computer system.

FIG. 1 is a block diagram illustrating an embodiment of a compile environment 10 in a computer system, such as computer system 100 shown in FIG. 6 and described in additional detail below, where the computer system is executing instructions to compile general purpose (GP) code 12 with data parallel (DP) portions 14 (hereafter GP code 12) into an general purpose (GP) executable 32 that includes a DP device executable 40. Compile environment 10 is generated in response to an invocation of a general purpose (GP) compiler 20 with data parallel extensions to compile all or selected modules of GP code 12. The invocation may be generated by a programmer or other user of the computer system or other code in the computer system, for example.

GP executable 32 represents a program intended for execution on one or more processors (e.g., central processing units (CPUs)). GP executable 32 includes low level instructions from an instruction set of one or more central processing units (CPUs). GP executable 32 may also include one or more DP device executables 40. A DP device executable 40 represents a data parallel program (e.g., a shader) intended for execution on one or more data parallel (DP) devices such as DP device 210 shown in FIG. 7 and described in additional detail below. DP devices are typically graphic processing units (GPUs) or the vector execution cores of CPUs but may also include the scalar execution cores of CPUs or other suitable devices in some embodiments. DP device executable 40 may include DP byte code that is converted to low level instructions from an instruction set of a DP device using a device driver (not shown). DP device executable 40 may also include low level instructions from an instruction set of one or more DP devices. Accordingly, GP executable 32 is directly executable by one or more central processing units (CPUs), and a containing DP device executable 40 is either directly executable by one or more DP devices or executable by one or more DP devices subsequent to being converted to the low level instructions of the DP device.

GP code 12 includes a sequence of instructions of a high level general purpose programming language with data parallel extensions (hereafter GP language) that form a program stored in a set of one or more modules. The GP language allows the program to be written in different parts (i.e., modules) such that each module may be stored in separate files or locations accessible by the computer system. The GP language provides a single language for programming a computing environment that includes one or more general purpose CPUs and one or more special purpose DP devices. Using the GP language, a programmer may include both CPU and DP device code in GP code 12 for execution by CPUs and DP devices, respectively, and coordinate the execution of the CPU and DP device code. GP code 12 may represent any suitable type of code, such as an application, a library function, or an operating system service.

In one embodiment, the GP language may be formed by extending a widely adapted, high level, and general purpose programming language such as C or C++ to include data parallel features. The GP language includes rich linking capabilities that allow different parts of a program to be included in different modules as shown in FIG. 1 with GP code 12. The data parallel features provide programming tools that take advantage of the special purpose architecture of DP devices to allow data parallel operations to be executed faster or more efficiently than with CPUs. In other embodiments, the GP language may be another suitable high level general purpose programming language that allows a programmer to program for both CPUs and DP devices.

GP code 12 includes one or more portions 14 in one or more modules with code designated for execution on a DP device. In one embodiment, the GP language allows a programmer designate a portion 14 of GP code 12 as DP device code using an annotation 16 (e.g., _declspec(vector) . . . ) when defining a kernel function (also referred to as a vector function). The annotation 16 is associated with a function name 17 (e.g., kernel_func) of the kernel function that is intended for execution on a DP device. Code portions 14 may also include one or more invocations 18 of the kernel function (e.g., forall . . . , kernel_func, . . . ). The kernel function may call other kernel functions in GP code 12 (i.e., other DP device code) and may use types (e.g., classes or structs) defined by GP code 12. The types may or may not be annotated as DP device code. In other embodiments, other suitable programming language constructs may be used to designate portions 14 of GP code 12 as DP device code and/or CPU code.

Compile environment 10 includes a GP compiler 20 and a linker 30. GP compiler 20 is configured to compile GP code 12, where GP code 12 is written in a GP language, stored in one or more modules, and includes both CPU code and DP device code. GP compiler 20 may be formed by extending the compiler functionality of a widely adapted, high level, and general purpose programming language compiler, such as a C or C++ compiler, to have the ability to compile both CPU code and DP device code in GP code 12.

For CPU code in GP code 12, GP compiler 20 compiles the one or more modules with CPU code into one or more object or intermediate representation (IR) files 22 with symbols that identify the relationships between the one or more object or IR files 22. Linker 30 receives the objects or files 22 and combines the objects or files 22 into an GP executable 32 and resolves the symbols between the one or more object or IR files 22. GP executable 32 includes low level instructions from an instruction set defined by a CPU. Accordingly, GP executable 32 is directly executable by one or more CPUs that implement the instruction set.

For DP device code in portions 14 of GP code 12, GP compiler 20 and linker 30 combine to generate a single, self-contained DP device source code unit 36 (e.g., a file or a string) in a high level data parallel (DP) device language for each invocation 18 in each portion 14 of GP code 12. Linker 30 provides each DP device source code unit 36 to a DP device compiler 38. DP device compiler 38 is configured to compile code written in a high level DP device programming language such as HLSL (High Level Shader Language) rather than code written in the GP language of GP code 12. In one embodiment, GP compiler 20 translates portions 14 from the GP language into the high level DP device programming language for later inclusion in DP device source code unit 36 by a binder 34 in linker 30. In another embodiment, GP compiler 20 translates portions 14 from the GP language into an intermediate representation (IR) and binder 34 translates the IR into the high level DP device programming language for inclusion in DP device source code unit 36.

In addition, DP device compiler 38 includes limited or no linking capability. To operate with this single module mode of DP device compiler 38, GP compiler 20 and linker 30 generate the DP device source code unit 36 for each invocation 18 to be fully self-contained—i.e., include all DP device source code for kernel functions and types that stem from a corresponding invocation 18 in a portion 14 of GP code 12.

In particular, GP compiler 20 separately translates each invocation 18, kernel function, and type into DP intermediate code (i.e., DP device source code or IR) in a set of binding descriptors 24 along with other binding information. Linker 30 includes binder 34 that binds the DP intermediate code from the set of binding descriptors 24 into a DP device source code unit 36 by traversing the call graph rooted from an invocation 18 and formed by the set of binding descriptors 24, translating DP intermediate code into DP device source code (if necessary), and concatenating the DP device source code from the set of binding descriptors 24. The functions of binder 34 may be performed by binder 34 statically if all needed DP intermediate code is available or dynamically at runtime. DP device compiler 38 compiles each DP device source code unit 36 with high level instructions from the high level DP device language into a corresponding DP device executable 40 with byte code or low level instructions from an instruction set of a DP device that is intended for execution on a DP device.

Although shown separately from GP compiler 20 and linker 30 in the embodiment of FIG. 1, DP device compiler 38 may be included in GP compiler 20, linker 30, or binder 34 in other embodiments.

Figure 2:
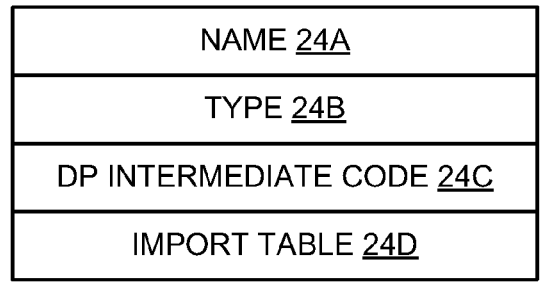
FIG. 2 is a block diagram illustrating an embodiment of a binding descriptor.

FIG. 2 is a block diagram illustrating an embodiment of a binding descriptor 24. GP compiler 20 generates a binding descriptor 24 for each invocation, function, and type that stems from an invocation 18. Binding descriptor 24 includes a name 24A that stores a unique name for the corresponding invocation, function, or type, a type 24B that indicates whether the binding descriptor 24 is a declaration binding descriptor, a definition binding descriptor, or an invocation stub binding descriptor, the DP intermediate code 24C for the corresponding invocation, function, or type, and an import table 24D with references to other binding descriptors 24 of other functions and types referenced by the corresponding invocation, function, or type, if any.

GP compiler 20 uses a naming convention for kernel functions and types used in the DP intermediate code. The naming convention ensures that a unique name is used for each kernel function and type and that the unique name is used consistently for each instance of a function and a type. In addition, GP compiler 20 uses a naming convention for names used for identifying binding descriptors 24. This naming convention allows binding descriptors 24 to be uniformly referenced in import tables 24D based on locally available information. The naming conventions may be based on the names of the kernel functions and types in GP code 12.

Figure 4A:
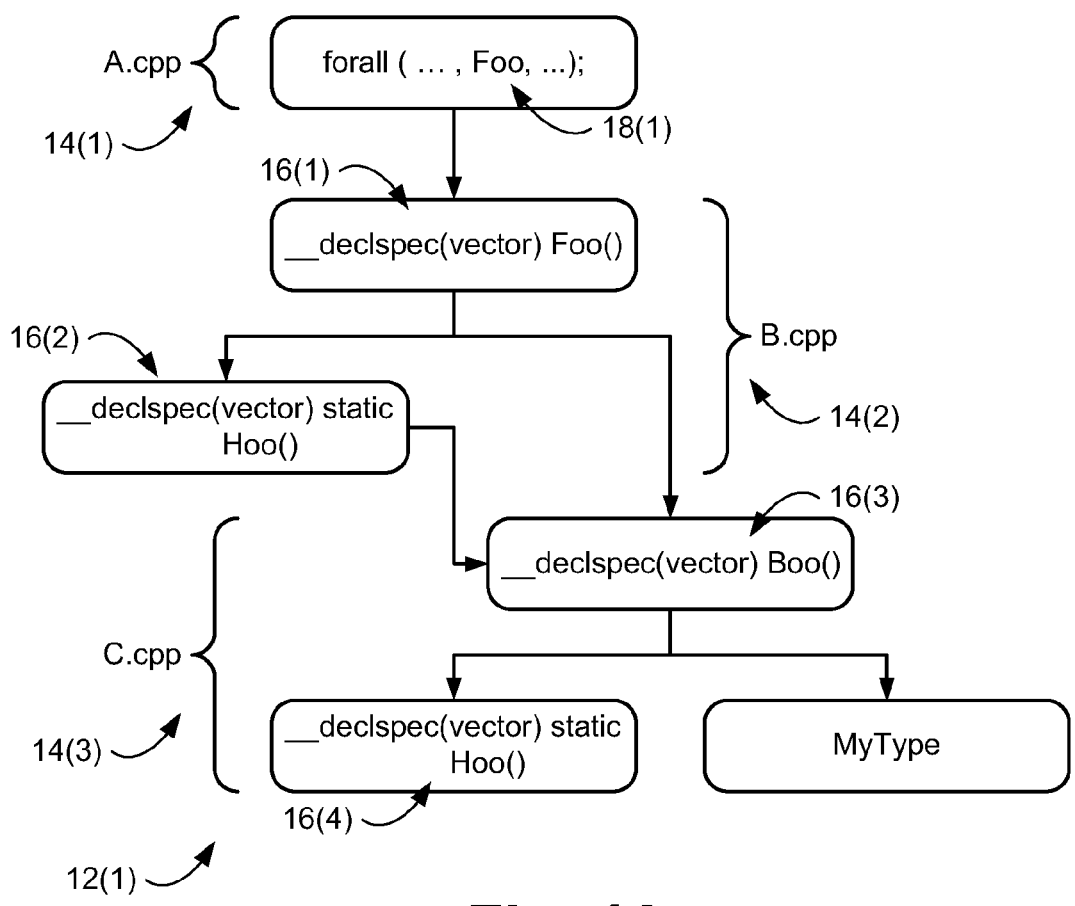
FIGS. 4A-4B are block diagrams illustrating an example of generating binding descriptors.
Figure 3:
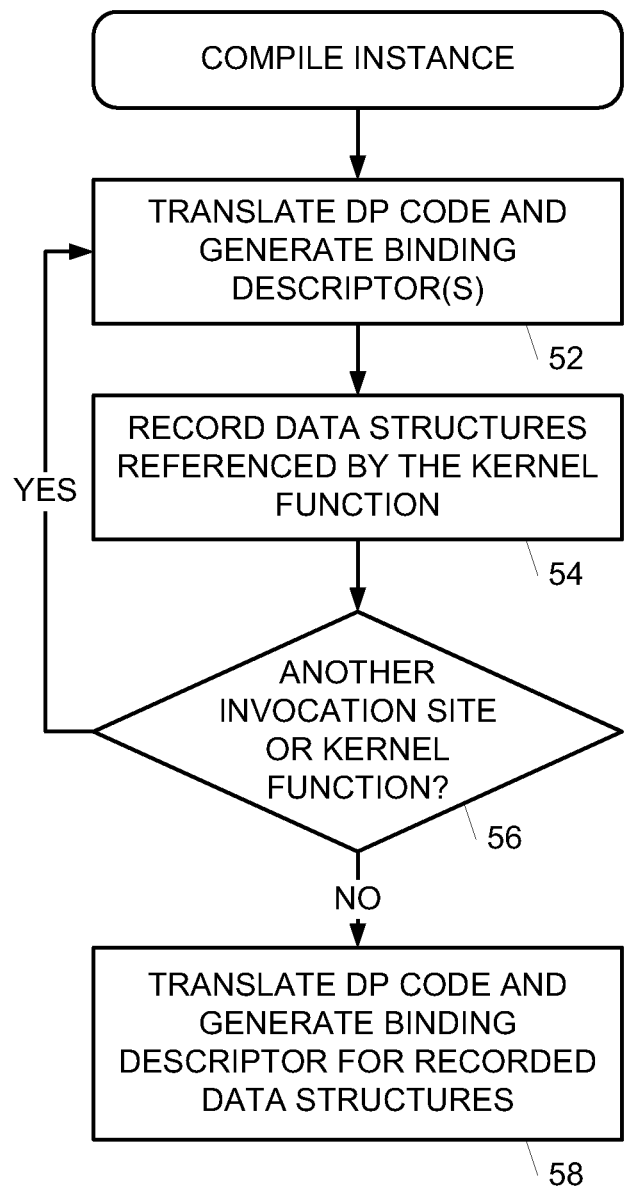
FIG. 3 is a flow chart illustrating an embodiment of a method performed by a compiler.
Figure 4B:
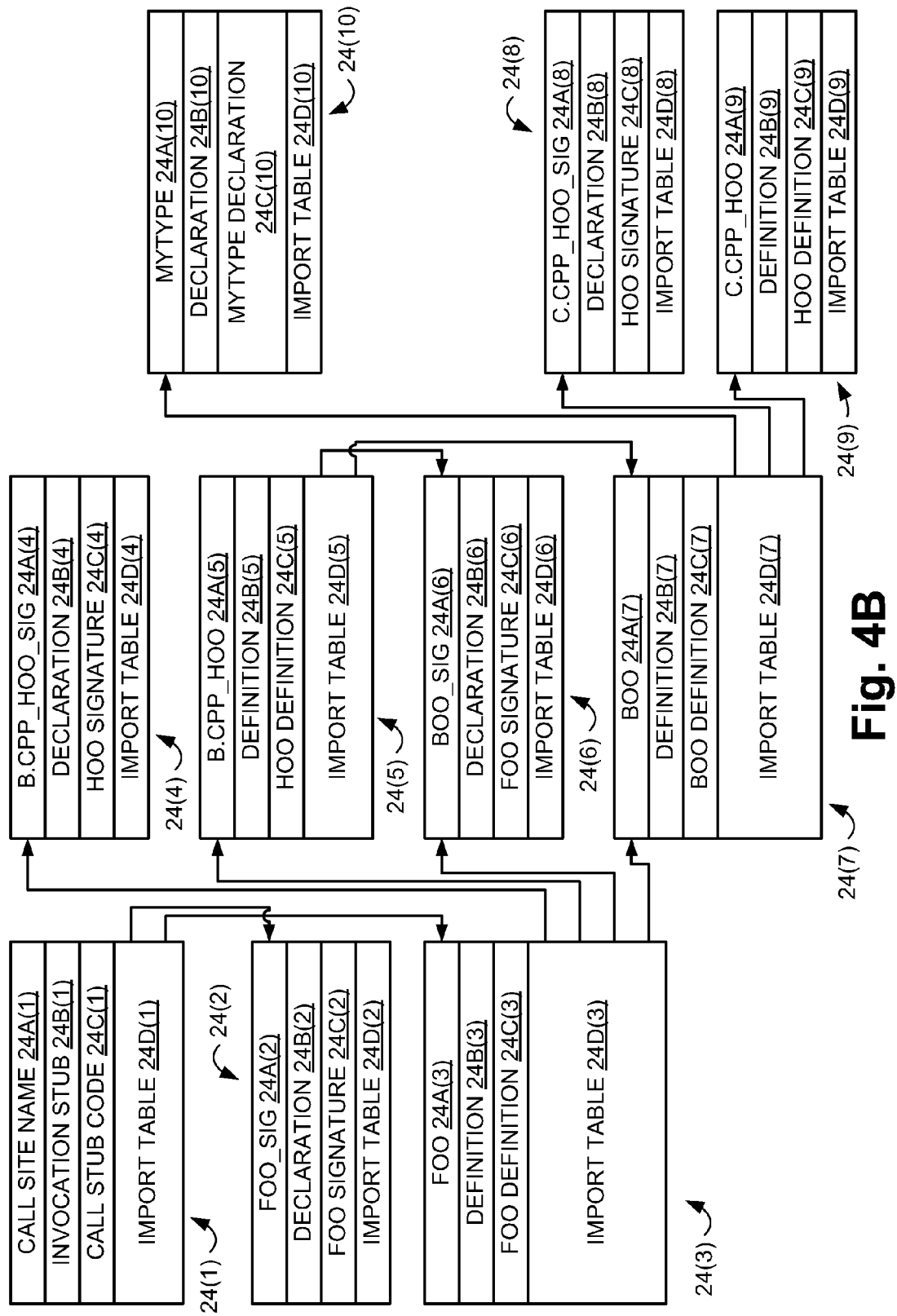
Figure 5:
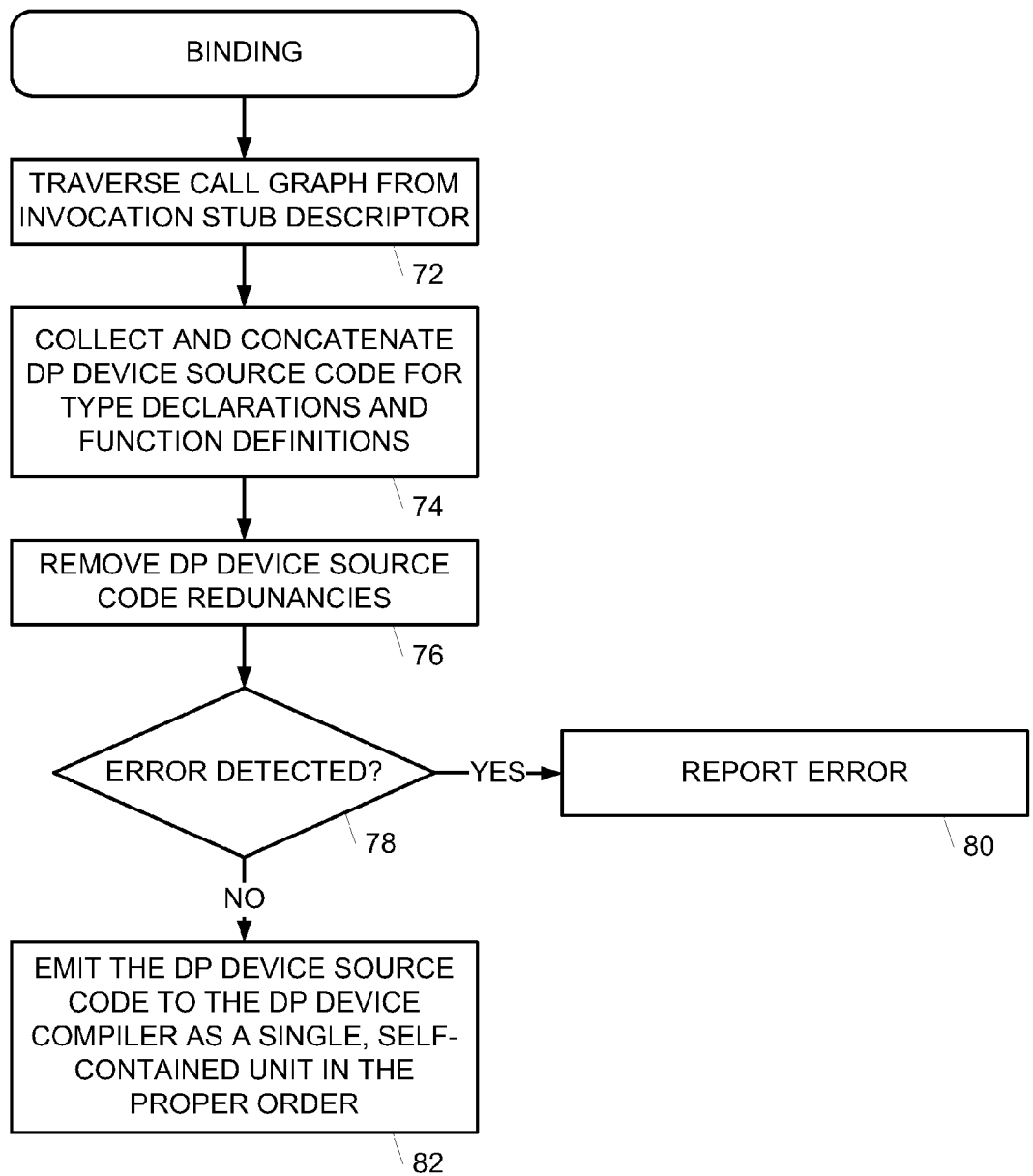
FIG. 5 is a flow chart illustrating an embodiment of a method performed by a binder.

Additional details of the process of compiling one or more DP device code portions 14 in GP code 12 into a DP device executable 40 will now be described with reference to FIGS. 3-5. FIG. 3 is a flow chart illustrating an embodiment of a method performed by GP compiler 20, FIGS. 4A-4B are block diagrams illustrating an example of generating binding descriptors 24, and FIG. 5 is a flow chart illustrating an embodiment of a method performed by binder 34.

In the embodiment described with reference to FIGS. 3-5, GP compiler 20 generates three types of binding descriptors 24—an invocation stub binding descriptor 24, a declaration binding descriptor 24, and a definition binding descriptor 24. In other embodiments, GP compiler 20 may generates other suitable types of binding descriptors 24 or other suitable data structures that function as binding descriptors 24.

GP compiler 20 performs the method of FIG. 3 anytime that GP compiler 20 is invoked to compile a module of GP code 12 that includes an invocation 18 (i.e., a DP device code invocation site) or a kernel function. As shown in FIG. 3, GP compiler 20 translates the DP code of a detected invocation 18 or kernel function in GP code 12 and generates an invocation stub binding descriptor 24 for the invocation 18 or declaration and definition binding descriptors 24 for the kernel function as indicated in a block 52. For both invocations 18 or kernel functions, GP compiler 20 translates the DP code in GP code 12 from the GP language into DP intermediate code and stores the DP intermediate code into the generated binding descriptor or descriptors 24. GP compiler 20 also records the types referenced by the kernel function in the binding descriptors 24, if any, as indicated in a block 54. GP compiler 20 performs the functions of blocks 52 and 54 for each invocation 18 and kernel function in a module as indicated in a block 56.

For an invocation 18, GP compiler 20 translates the DP code of the invocation 18 from the GP language into DP intermediate code that is used to setup the call to the invoked kernel function. GP compiler 20 stores this DP intermediate code into DP intermediate code 24C in an invocation stub binding descriptor 24 for the invocation site 18 along with references to the declaration and definition binding descriptors 24 of the invoked kernel function and references to the declaration binding descriptors 24 of any types used by the invocation site in import table 24D.

FIG. 4A illustrates an example of GP code 12(1) that includes portions 14(1), 14(2), and 14(3) of DP code in modules A.cpp, B.cpp, and C.cpp, respectively, written in a GP language that is built on C++ with DP extensions. In response to GP compiler 20 being invoked to compile module A.cpp, GP compiler 20 identifies an invocation 18(1) of a kernel function Foo. As shown in the example of FIG. 4B, GP compiler 20 generates an invocation stub binding descriptor 24(1) in performing the function of block 52 of FIG. 3 for the invocation 18(1) (shown in FIG. 4A). GP compiler 20 generates invocation stub binding descriptor 24(1) to include a unique name for the call site 24A(1), an indicator 24B(1) that the binding descriptor 24(1) is an invocation stub descriptor, the call stub code 24C(1) translated into the DP intermediate code by GP compiler 20, and an import table 24D(1) with references to the binding descriptors 24(2) and 24(3) of the invoked kernel function Foo. Because module A.cpp only includes a single invocation 18(1) and does not include any kernel functions, GP compiler 20 only generates binding descriptor 24(1) for module A.cpp.

For a kernel function, GP compiler 20 generates a declaration binding descriptor 24 and a definition binding descriptor 24. GP compiler 20 generates a declaration binding descriptor 24 that includes the DP intermediate code for declaring the kernel function in DP intermediate code 24C and references to the declaration binding descriptors 24 of any types used in the declaration of the kernel function in import table 24D. GP compiler 20 also generates a definition binding descriptor 24 that includes the DP intermediate code for defining the kernel function in DP intermediate code 24C, references to declaration and definition binding descriptors 24 of any called kernel functions in import table 24D, references to the declaration binding descriptors 24 of any types used by the kernel function in import table 24D, and references to the definition binding descriptors 24 of any member functions used by the kernel function in import table 24D.

In response to GP compiler 20 being invoked to compile module B.cpp in the example of FIG. 4A, GP compiler 20 identifies kernel function Foo 16(1) and generates a declaration binding descriptor 24(2) and a definition binding descriptor 24(3) for the kernel function Foo in performing the function of block 52 of FIG. 3 as shown in FIG. 4B. GP compiler 20 generates declaration binding descriptor 24(2) to include a unique name for the signature of Foo 24A(2), an indicator 248(2) that the binding descriptor 24(2) is a declaration binding descriptor, the signature of Foo 24C(2) translated into DP intermediate code by GP compiler 20, and an empty import table 24D(2). GP compiler 20 generates definition binding descriptor 24(3) to include a unique name for Foo 24A(3), an indicator 24B(3) that the binding descriptor 24(3) is a definition binding descriptor, the definition of Foo 24C(3) translated into the DP intermediate code by GP compiler 20, and an import table 24D(3) with references to a declaration binding descriptor 24(4) and a definition binding descriptor 24(5) for the kernel function Hoo in module B.cpp and a declaration binding descriptor 24(6) and a definition binding descriptor 24(7) for the kernel function Boo.

GP compiler 20 also identifies kernel function Hoo 16(2) in module B.cpp. GP compiler 20 generates a declaration binding descriptor 24(4) and a definition binding descriptor 24(5) in performing the function of block 52 of FIG. 3 for the function Hoo in module B.cpp. GP compiler 20 generates declaration binding descriptor 24(4) to include a unique name for the signature of B.cpp Hoo 24A(4), an indicator 24B(4) that the binding descriptor 24(4) is a declaration binding descriptor, the signature of B.cpp Hoo 24C(4) translated into DP intermediate code by GP compiler 20, and an empty import table 24D(4). GP compiler 20 generates definition binding descriptor 24(5) to include a unique name for B.cpp Hoo 24A(5), an indicator 24B(5) that the binding descriptor 24(5) is a definition binding descriptor, the definition of B.cpp Hoo 24C(5) translated into DP intermediate code by GP compiler 20, and an import table 24D(5) with references to a declaration binding descriptor 24(6) and a definition binding descriptor 24(7) for the kernel function Boo in module C.cpp.

Thus, for module B.cpp, GP compiler 20 generates binding descriptors 24(2) and 24(3) for kernel function Foo and binding descriptors 24(4) and 24(5) for kernel function Hoo in B.cpp.

In response to GP compiler 20 being invoked to compile module C.cpp in the example of FIG. 4A, GP compiler 20 identifies kernel function Boo 16(3) in module C.cpp and generates a declaration binding descriptor 24(6) and a definition binding descriptor 24(7) in performing the function of block 52 of FIG. 3 for the function Boo. GP compiler 20 generates declaration binding descriptor 24(6) to include a unique name for the signature of Boo 24A(6), an indicator 24B(6) that the binding descriptor 24(6) is a declaration binding descriptor, the signature of Boo 24C(6) translated into DP intermediate code by GP compiler 20, and an empty import table 24D(6). GP compiler 20 generates definition binding descriptor 24(7) to include a unique name for Boo 24A(7), an indicator 24B(7) that the binding descriptor 24(7) is a definition binding descriptor, the definition of Boo 24C(7) translated into DP intermediate code by GP compiler 20, and an import table 24D(7) with references to a declaration binding descriptor 24(8) and a definition binding descriptor 24(9) for the kernel function Hoo in module C.cpp. GP compiler 20 also detects that Boo references a type MyType. Accordingly, GP compiler 20 records the type MyType in performing the function of block 54 of FIG. 3.

GP compiler 20 also identifies kernel function Hoo 16(4) in module C.cpp. GP compiler 20 generates a declaration binding descriptor 24(8) and a definition binding descriptor 24(9) in performing the function of block 52 of FIG. 3. GP compiler 20 generates declaration binding descriptor 24(8) to include a unique name for the signature of C.cpp Hoo 24A(8), an indicator 24B(8) that the binding descriptor 24(8) is a declaration binding descriptor, the signature of C.cpp Hoo 24C(8) translated into DP intermediate code by GP compiler 20, and, because C.cpp Hoo does not use any types as determined in block 56 in FIG. 3, an empty import table 24D(8). GP compiler 20 generates definition binding descriptor 24(9) to include a unique name for C.cpp Hoo 24A(9), an indicator 24B(9) that the binding descriptor 24(9) is a definition binding descriptor, the definition of C.cpp Hoo 24C(9) translated into DP intermediate code by GP compiler 20, and an empty import table 24D(9) because C.cpp Hoo does not call any other kernel functions.

Thus, for module C.cpp, GP compiler 20 generates binding descriptors 24(6) and 24(7) for kernel function Boo and binding descriptors 24(8) and 24(9) for kernel function Hoo in C.cpp.

Referring back to FIG. 3, GP compiler 20 translates the DP code and generates a binding descriptor 24 for each type recorded by GP compiler 20 in block 54 as indicated in a block 58. GP compiler 20 translates the DP code for each type from the GP language into DP intermediate code for declaring the type and stores the DP intermediate code into corresponding DP intermediate code 24C in a corresponding declaration binding descriptor 24 for the type along with references to the declaration binding descriptors 24 of any other types used by the type in import table 24D. GP compiler 20 stores the DP intermediate code into DP intermediate code 24C with the body of any member functions removed. For each member function, GP compiler 20 also generates a definition binding descriptor 24 that includes the DP intermediate code for defining the member function outside the class definition body in DP intermediate code 24C. GP compiler 20 also includes references to the declaration binding descriptors 24 of any types used by the member function, references to the declaration binding descriptors 24 of any non-member functions called by the member function, and references to the definition binding descriptors 24 of any other member functions called by the member function.

With reference to the example of FIG. 4B, GP compiler 20 generates a declaration binding descriptor 24(10) in performing the function of block 58 of FIG. 3 for the type MyType referenced by the kernel function Boo in compiling module C.cpp. GP compiler 20 generates declaration binding descriptor 24(10) to include a unique name for MyType 24A(10), an indicator 24B(10) that the binding descriptor 24(10) is a declaration descriptor, the DP intermediate code for declaring the type as translated by GP compiler 20 in DP intermediate code 24C(10), and an empty import table 24D(10).

The functions performed by binder 34 in one embodiment will now be described with reference to FIG. 5. In FIG. 5, binder 34 traverses the call graph formed by the set of binding descriptors 24 for an invocation site starting from the invocation stub descriptor 24 as indicated in a block 72. For all type declarations and function definitions from the set of binding descriptors 24, binder 34 collects the DP intermediate code from the set of binding descriptors 24, translates DP intermediate code into DP device source code (if necessary), and concatenates the DP device source code as indicated in a block 74. Binder 34 removes any redundancies in the DP device source code as indicated in a block 76 and determines whether any errors are detected (e.g., a recursive call that is not supported) as indicated in a block 78. If no errors are detected, binder 34 emits the DP device source code unit 36 to DP device compiler 38 as a single, self-contained unit in the proper order as indicated in a block 82. If errors are detected, binder 34 reports the errors as indicated in a block 80.

In the example of FIGS. 4A-4B, binder 34 traverses the call graph formed by binding descriptors 24(1)-24(10) for invocation 18(1) starting from invocation stub descriptor 24(9). Binder 34 collects the DP intermediate code from the set of binding descriptors 24(2)-24(10), translates DP intermediate code into DP device source code (if necessary), and concatenates the DP device source code for the MyType type declaration and the Foo, B.cpp Hoo, Boo, and C.cpp Hoo function definitions from binding descriptors 24(2)-24(10). Binder 34 emits the DP device source code unit 36 generated from binding descriptors 24(1)-24(10) in the correct program order and without redundancy for invocation 18(1) to DP device compiler 38.

The above embodiments may close a gap between general purpose languages with rich linking capabilities and DP device languages with little or no linking capabilities. The above embodiments may do so while maintaining a current toolchain flow of a general purpose language and allowing programmers to program both CPUs and data parallel devices together in a modular and componentized way.

Figure 6:
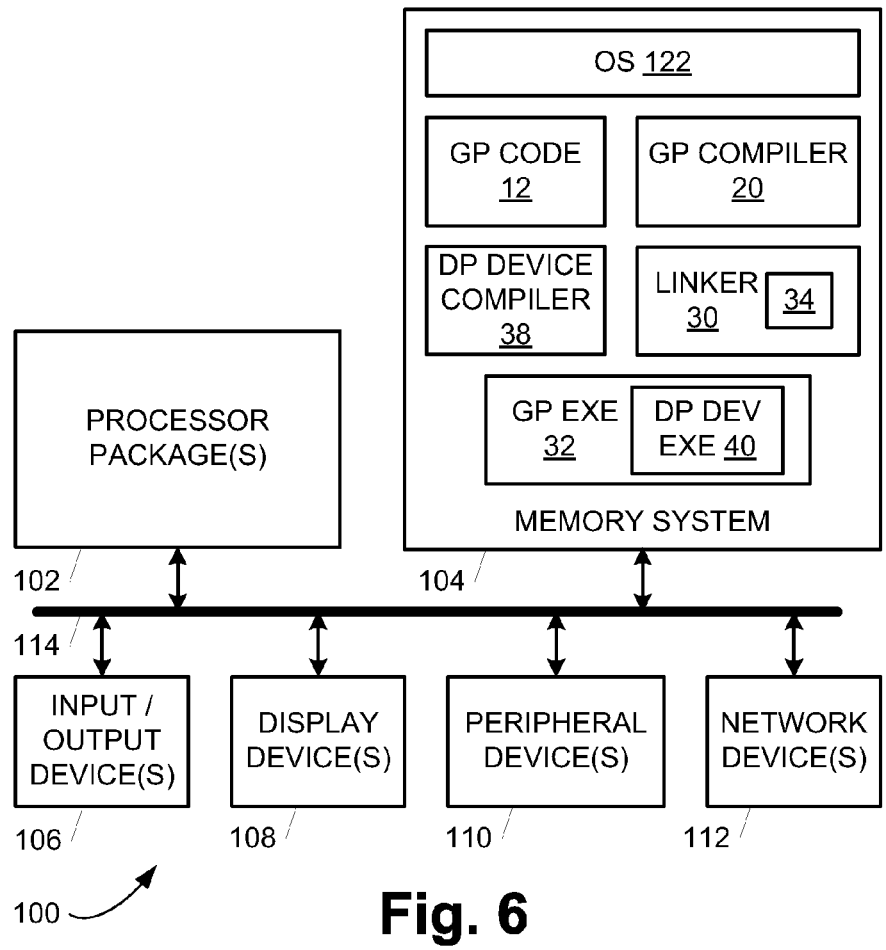
FIG. 6 is a block diagram illustrating an embodiment of a computer system configured to implement a compile environment.

FIG. 6 is a block diagram illustrating an embodiment of a computer system configured to implement compile environment 10 as shown in FIG. 1.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, a smart phone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more processing cores that form execution hardware configured to execute instructions (i.e., software). Each processor package 102 may include processing cores with the same or different architectures and/or instruction sets. For example, the processing cores may include any combination of in-order execution cores, superscalar execution cores, and data parallel execution cores (e.g., GPU execution cores). Each processing core is configured to access and execute instructions stored in memory system 104. The instructions may include a basic input output system (BIOS) or firmware (not shown), an operating system (OS) 122, GP code 12, GP compiler 20, linker 30 with binder 34, DP device compiler 38, and GP executable 32 with DP device executable 40. Each processing core may execute the instructions in conjunction with or in response to information received from input/output devices 106, display devices 108, peripheral devices 110, and/or network devices 112.

Computer system 100 boots and executes OS 122. OS 122 includes instructions executable by the processing cores to manage the components of computer system 100 and provide a set of functions that allow programs to access and use the components. In one embodiment, OS 122 is the Windows operating system. In other embodiments, OS 122 is another operating system suitable for use with computer system 100. Computer system 100 executes GP compiler 20, linker 30, binder 34, and DP device compiler 38 to generate GP executable 32 with DP device executable 40 from GP code 12 as described above. Computer system 100 may execute GP executable 32, including DP device executable 40, using one or more processing cores as described with reference to the embodiment of FIG. 7 below.

Memory system 104 includes any suitable type, number, and configuration of volatile or non-volatile storage devices configured to store instructions and data. The storage devices of memory system 104 represent computer readable storage media that store computer-executable instructions (i.e., software) including OS 122, GP code 12, GP compiler 20, linker 30, binder 34, DP device compiler 38, and GP executable 32 with DP device executable 40. The instructions are executable by computer system 100 to perform the functions and methods of OS 122, GP code 12, GP compiler 20, linker 30, binder 34, DP device compiler 38, GP executable 32, and DP device executable 40 as described herein. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. Examples of storage devices in memory system 104 include hard disk drives, random access memory (RAM), read only memory (ROM), flash memory drives and cards, and magnetic and optical disks such as CDs and DVDs.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Figure 7:
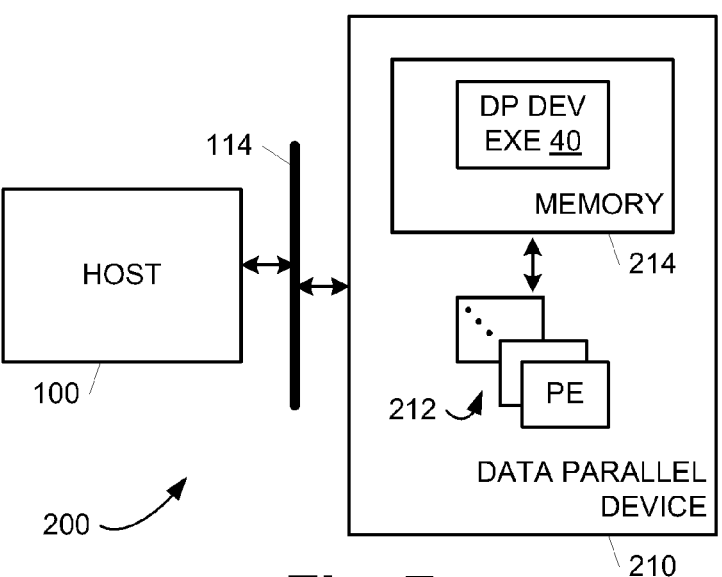
FIG. 7 is a block diagram illustrating an embodiment of a computer system with a data parallel device that is configured to execute a DP device executable.

FIG. 7 is a block diagram illustrating an embodiment of a computer system 200 with a DP device 210 that is configured to execute a DP device executable 40. In the embodiment of FIG. 7, computer system 100 (shown in FIG. 6) forms a host that is configured to provide DP device executable 40 to DP device 210 for execution and receive results generated by DP device executable 40 using interconnections 114 (FIG. 6). DP device 210 includes a set of one or more processing elements (PEs) 212 and a memory 214 that stores DP device executable 40. PEs 212 execute DP device executable 40 and store the results generated by DP device executable 40 in memory 214 (not shown).

In one embodiment, DP device 210 represents a graphics card where one or more graphics processing units (GPUs) include PEs 212 and a memory 214 that is separate from memory 104 (FIG. 6). In this embodiment, a driver of the graphics card (not shown) may convert byte code of DP device executable 40 into the instruction set of the GPUs for execution by the PEs 212 of the GPUs.

In another embodiment, DP device 210 is formed from the combination of one or more GPUs (i.e. PEs 212) that are included in processor packages 102 (FIG. 6) with one or more CPU execution cores and a portion 214 of memory 104 (FIG. 6). In this embodiment, additional software may be provided on computer system 100 to convert byte code of DP device executable 40 into the instruction set of the GPUs in processor packages 102.

In further embodiment, DP device 210 is formed from the combination of one or more vector processing pipelines in one or more of the execution cores of processor packages 102 (FIG. 6) and a portion 214 of memory 104 (FIG. 6). In this embodiment, additional software may be provided on computer system 100 to convert the byte code of DP device executable 40 into the instruction set of the vector processing pipelines in processor packages 102.

In yet another embodiment, DP device 210 is formed from the combination of one or more scalar processing pipelines in one or more of the execution cores of processor packages 102 (FIG. 6) and a portion 214 of memory 104 (FIG. 6). In this embodiment, additional software may be provided on computer system 100 to convert the byte code of DP device executable 40 into the instruction set of the scalar processing pipelines in processor packages 102.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a computer system, the method comprising:
   translating a first portion of general purpose data parallel code that is intended for execution on one or more data parallel devices into first data parallel device source code wherein the first portion includes an annotation that identifies a kernel function that is intended for execution on the one or more data parallel devices;
   translating a second portion of the general purpose data parallel code that is intended for execution on the one or more data parallel devices into second data parallel device source code;
   binding the first and the second data parallel device source codes into a single self-contained data parallel device source code unit based on a generated set of binding descriptors for a set of kernel functions annotated as device parallel device code, by traversing a call graph formed by the set of binding descriptors;
   generating a data parallel device executable from the self-contained data parallel device code unit; and
   merging the data parallel device executable into a general purpose executable,
   wherein at least one of the kernel functions uses a type defined by the general purpose code and the type is not annotated as data parallel device code.

2. The method of claim 1 further comprising:
   executing the data parallel device executable with the one or more data parallel devices.

3. The method of claim 1 further comprising:
   generating the general purpose executable from a third portion of the general purpose data parallel code that is intended for execution on a central processing unit (CPU).

4. The method of claim 1 wherein the second portion includes an invocation of the kernel function.

5. The method of claim 1 further comprising:
   generating a first set of one or more binding descriptors that include first data parallel intermediate code corresponding to the first data parallel device source code; and
   generating a second set of one or more binding descriptors that include second data parallel intermediate code corresponding to the second data parallel device source code and a reference to at least one of the first set of binding descriptors.

6. The method of claim 5 wherein the first set of one or more binding descriptors correspond to a kernel function, and wherein the second set of one or more binding descriptors corresponds to an invocation of the kernel function.

7. A method performed by a computer system, the method comprising:
   generating a set of binding descriptors for a set of kernel functions that include at least first and second data parallel intermediate codes translated from first and second portions of general purpose code, respectively, intended for execution on one or more data parallel devices, wherein in at least a portion of the set of binding descriptors is annotated as device parallel device code in the general purpose code and wherein the first portion includes an annotation that identifies a kernel function that is intended for execution on the one or more data parallel devices;
   binding first and second data parallel device source codes from the first and the second data parallel intermediate codes into a self-contained data parallel device source code unit; and
   generating a data parallel device executable for execution on one or more data parallel devices from the self-contained data parallel device source code unit; and
   merging the generated data parallel device executable into a general purpose executable,
   wherein at least one of the kernel functions uses a type defined by the general purpose code and the type is not annotated as data parallel device code.

8. The method of claim 7 wherein the first portion of the data parallel code is stored in a first module, and wherein the second portion of the data parallel code is stored in a second module.

9. The method of claim 7 further comprising:
   generating a declaration binding descriptor in the set of binding descriptors for the kernel function; and
   generating a definition binding descriptor in the set of binding descriptors for the kernel function.

10. The method of claim 9 wherein the second portion includes an invocation of the kernel function.

11. The method of claim 10 further comprising:
    generating an invocation stub binding descriptor in the set of binding descriptors for the invocation.

12. The method of claim 7 further comprising:
    generating the general purpose executable for execution on a central processing unit (CPU) from a third portion of the general purpose code.

13. A computer readable storage memory storing computer-executable instructions that, when executed by a computer system, perform a method comprising:
    translating a first portion of general purpose data parallel code that is intended for execution on one or more data parallel devices into first data parallel device source code;
    translating a second portion of the general purpose data parallel code that is intended for execution on the one or more data parallel devices into second data parallel device source code
    generating a set of binding descriptors for a set of kernel functions annotated as device parallel device code in the general purpose code, each of the set of kernel functions intended for execution on one or more data parallel devices;
    generating an invocation stub binding descriptor for an invocation of one of the kernel functions;
    generating a second set of binding descriptors for types referenced by the set of kernel functions;
    traversing a call graph formed by the first set of binding descriptors, the invocation stub binding descriptor, and the second set of binding descriptors to generate a self-contained data parallel device source code unit;
    compiling the self-contained data parallel device source code unit to generate a data parallel device executable; and
    merging the data parallel device executable into a general purpose executable,
    wherein at least one of the kernel functions uses a type defined by the general purpose code and the type is not annotated as data parallel device code.

14. The computer readable storage memory of claim 13, the method further comprising:
    executing the data parallel device executable with the one or more data parallel devices.

15. The computer readable storage memory of claim 14, wherein the set of kernel functions is stored in at least two modules.

16. The computer readable storage memory of claim 15, the method further comprising:
   generating the general purpose executable for execution on a central processing unit (CPU) from the general purpose code.

\* \* \* \* \*